(12) United States Patent
Shane (10) Patent No.: US 12,319,089 B2
(45) Date of Patent: Jun. 3, 2025

(54) SYSTEM AND METHOD FOR AN AGRICULTURAL APPLICATOR

(71) Applicant: CNH Industrial America LLC, New Holland, PA (US)

(72) Inventor: Aaron Shane, Burlington, IA (US)

(73) Assignee: CNH Industrial America LLC, New Holland, PA (US)

( * ) Notice: Subject to any disclaimer, the term of this patent is extended or adjusted under 35 U.S.C. 154(b) by 65 days.

(21) Appl. No.: 18/131,190

(22) Filed: Apr. 5, 2023

(65) Prior Publication Data
US 2024/0336088 A1 Oct. 10, 2024

(51) Int. Cl.
*B60B 35/10* (2006.01)
*A01B 69/04* (2006.01)
(Continued)

(52) U.S. Cl.
CPC ........ *B60B 35/1063* (2013.01); *A01B 69/008* (2013.01); *B60B 35/1054* (2013.01);
(Continued)

(58) Field of Classification Search
CPC ............ B60B 35/1063; B60B 35/1054; B60B 35/109; A01B 69/008; A01C 23/00; A01M 7/0089
See application file for complete search history.

(56) References Cited

U.S. PATENT DOCUMENTS 10,689,029 B2  6/2020  Schwalbe et al.
11,180,184 B2  11/2021  Brooks et al.
(Continued)

FOREIGN PATENT DOCUMENTS

CN  112219477 A  1/2021
CN  113878593 A  1/2022
(Continued)

OTHER PUBLICATIONS

"Research Status of High Clearance Sprayer and Its Steering System at Home and Abroad" Applied Science and Innovative Research vol. 5, No. 2, 2021 Scholink Inc. May 25, 2021 (10 pages) https://www.researchgate.net/publication/351850688_Research_Status_of_High_Clearance_Sprayer_and_Its_Steering_System_at_Home_and_Abroad/fulltext/60ad7f09299bf13438e828b1/Research-Status-of-High-Clearance-Sprayer-and-Its-Steering-System-at-Home-and-Abroad.pdf.

(Continued)

*Primary Examiner* — Xiao En Mo
(74) *Attorney, Agent, or Firm* — Dority & Manning, P.A.

(57) ABSTRACT

A vehicle system includes an axle arrangement operably coupling a wheel assembly with a frame. The frame defines a fore-aft axis and a transverse axis extending generally transverse to the fore-aft axis. The axle arrangement includes first and second axle elements adapted for operative connection between the frame and the wheel assembly for extension and retraction along the transverse axis. The first axle element can be operably coupled with the frame and the second axle element can be integrated with the wheel assembly. One or more sensors can be configured to generate vehicle dat. A computing system can be configured to receive an input related to an adjustment to the position of the second axle element relative to the fore-aft axis and generate an adjustment model based at least partially on the input and the vehicle data.

20 Claims, 7 Drawing Sheets

(51) Int. Cl.
*A01C 23/00* (2006.01)
*A01M 7/00* (2006.01)

(52) U.S. Cl.
CPC ............ *B60B 35/109* (2013.01); *A01C 23/00* (2013.01); *A01M 7/0089* (2013.01)

(56) References Cited

U.S. PATENT DOCUMENTS

| | | | |
|---|---|---|---|
| 11,279,400 B1* | 3/2022 | Eaton | B60B 35/1054 |
| 11,284,556 B2 | 3/2022 | Schleicher et al. | |
| 11,383,573 B2 | 7/2022 | Zink | |
| 11,420,677 B2* | 8/2022 | Crowley | B62D 3/14 |
| 2020/0163269 A1 | 5/2020 | Crowley | |
| 2022/0066453 A1 | 3/2022 | Sneyders et al. | |

FOREIGN PATENT DOCUMENTS

| | | |
|---|---|---|
| DE | 102020105380 A1 | 9/2021 |
| EP | 3895918 A1 | 10/2021 |
| WO | 2021/238421 A1 | 12/2021 |

OTHER PUBLICATIONS

M.A. Miller et al. "Effects of Multi-Mode Four-Wheel Steering on Sprayer Machine Performance" Article vol. 47(2): 385-395 American Society of Agricultural Engineers ResearchGate Mar. 2004 (13 pages) https://www.researchgate.net/profile/B1-Steward/publication/228707712_Effects_of_multi-mode_four-wheel_steering_on_sprayer_machine_performance/links/02e7e53021351b0f85000000/Effects-of-multi-mode-four-wheel-steering-on-sprayer-machine-performance.pdf.

* cited by examiner

SYSTEM AND METHOD FOR AN AGRICULTURAL APPLICATOR

FIELD

The present disclosure generally relates to agricultural implements and, more particularly, to systems and methods for spray operations.

BACKGROUND

Various types of vehicles utilize applicators (e.g., sprayers, floaters, etc.) to deliver an agricultural product to a ground surface of a field. The agricultural product may be in the form of a solution or mixture, with a carrier (such as water) being mixed with one or more active ingredients (such as an herbicide, fertilizer, fungicide, a pesticide, or another product).

The applicators may be pulled as an implement or self-propelled and can include a tank, a pump, a boom assembly, and a plurality of nozzles carried by the boom assembly at spaced locations. The boom assembly can include a pair of boom arms, with each boom arm extending to either side of the applicator when in an unfolded state. Each boom arm may include multiple boom sections, each with a number of spray nozzles (also sometimes referred to as spray tips).

During a spray operation, the vehicle drives over a target to direct the agricultural product at the target. However, the targets within the field may be positioned at various widths relative to one another. Accordingly, a vehicle that is capable of having the width between its opposing, lateral wheel assemblies altered may be helpful in some implementations.

BRIEF DESCRIPTION

Aspects and advantages of the technology will be set forth in part in the following description, or may be obvious from the description, or may be learned through practice of the technology.

In some aspects, the present subject matter is directed to a vehicle system that includes an axle arrangement operably coupling a first wheel assembly with a frame. The frame defining a fore-aft axis and a first transverse axis extends generally transverse to the fore-aft axis. The axle arrangement includes first and second axle elements adapted for operative connection between the frame and the first wheel assembly for extension and retraction along the first transverse axis. The first axle element operably couples with the frame and the second axle element is integrated with the second wheel assembly. A steering actuator is operably coupled with the wheel assembly and the frame and is configured to alter a defined steering angle of a wheel of the wheel assembly relative to the fore-aft axis. A computing system is communicatively coupled to the steering actuator. The computing system is configured to receive an input related to an adjustment to a position of the second axle element relative to the fore-aft axis and determine a steering angle of the wheel based at least in part on a speed of the vehicle and an average speed of movement of the steering actuator.

In some aspects, the present subject matter is directed to a method for an operation of a vehicle system. The method includes receiving an input to alter a tread-width of a vehicle having a front axle arrangement and a rear axle arrangement. The method also includes receiving, from one or more sensors, vehicle data, wherein the vehicle data includes a current speed of the vehicle relative to a ground surface. The method further includes determining, with a computing system, an adjustment model based at least in part on the current speed of the vehicle. Lastly, the method includes generating instructions to alter the tread-width of the vehicle based on the adjustment model.

In some aspects, the present subject matter is directed to a vehicle system that includes an axle arrangement operably coupling a wheel assembly with a frame. The frame defines a fore-aft axis and a transverse axis extending generally transverse to the fore-aft axis. The axle arrangement includes first and second axle elements adapted for operative connection between the frame and the wheel assembly for extension and retraction along the transverse axis. The first axle element operably couples with the frame and the second axle element is integrated with the wheel assembly. One or more sensors is configured to generate vehicle data. A computing system is communicatively coupled to the one or more sensors. The computing system is configured to receive an input related to an adjustment to a position of the second axle element relative to the fore-aft axis and generate an adjustment model based at least partially on the input and the vehicle data.

These and other features, aspects, and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which.

Repeat use of reference characters in the present specification and drawings is intended to represent the same or analogous features or elements of the present technology.

DETAILED DESCRIPTION

Reference now will be made in detail to embodiments of the disclosure, one or more examples of which are illustrated in the drawings. Each example is provided by way of explanation of the discourse, not limitation of the disclosure.

In fact, it will be apparent to those skilled in the art that various modifications and variations can be made in the present disclosure without departing from the scope or spirit of the disclosure. For instance, features illustrated or described as part can be used with another embodiment to yield a still further embodiment. Thus, it is intended that the present disclosure covers such modifications and variations as come within the scope of the appended claims and their equivalents.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

As used herein, the terms "first," "second," and "third" may be used interchangeably to distinguish one component from another and are not intended to signify a location or importance of the individual components. The terms "coupled," "fixed," "attached to," and the like refer to both direct coupling, fixing, or attaching, as well as indirect coupling, fixing, or attaching through one or more intermediate components or features, unless otherwise specified herein. The terms "upstream" and "downstream" refer to the relative direction with respect to an agricultural product within a fluid circuit. For example, "upstream" refers to the direction from which an agricultural product flows, and "downstream" refers to the direction to which the agricultural product moves. The term "selectively" refers to a component's ability to operate in various states (e.g., an ON state and an OFF state) based on manual and/or automatic control of the component.

Furthermore, any arrangement of components to achieve the same functionality is effectively "associated" such that the functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected" or "operably coupled" to each other to achieve the desired functionality, and any two components capable of being so associated can also be viewed as being "operably couplable" to each other to achieve the desired functionality. Some examples of operably couplable include, but are not limited to, physically mateable, physically interacting components, wirelessly interactable, wirelessly interacting components, logically interacting, and/or logically interactable components.

The singular forms "a," "an," and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about," "approximately," "generally," and "substantially," is not to be limited to the precise value specified. In at least some instances, the approximating language may correspond to the precision of an instrument for measuring the value, or the precision of the methods or apparatus for constructing or manufacturing the components and/or systems. For example, the approximating language may refer to being within a ten percent margin.

Moreover, the technology of the present application will be described in relation to exemplary embodiments. The word "exemplary" is used herein to mean "serving as an example, instance, or illustration." Any embodiment described herein as "exemplary" is not necessarily to be construed as preferred or advantageous over other embodiments. Additionally, unless specifically identified otherwise, all embodiments described herein should be considered exemplary.

As used herein, the term "and/or," when used in a list of two or more items, means that any one of the listed items can be employed by itself, or any combination of two or more of the listed items can be employed. For example, if a composition or assembly is described as containing components A, B, and/or C, the composition or assembly can contain A alone: B alone: C alone: A and B in combination; A and C in combination: B and C in combination: or A, B, and C in combination.

In general, the present subject matter is directed to a vehicle system one or more axle arrangements each operably coupling a wheel assembly with a frame. The frame defines a fore-aft axis and a transverse axis extending generally transverse to the fore-aft axis.

Each of the one or more axle arrangements can include first and second axle elements adapted for operative connection between the frame and the wheel assembly for extension and retraction along the transverse axis. In some cases, the first axle element can be operably coupled with the frame and the second axle element can be integrated with the wheel assembly.

In some instances, one or more sensors may be configured to generate vehicle data. For example, the vehicle data may be received from respective wheel assembly sensors operably coupled with each wheel assembly. In various instances, each wheel assembly sensor may be capable of providing data related to the rotational speed of a tire (or another ground-engaging component) relative to a ground surface, an orientation of the tire (or another ground-engaging component) relative to the frame, a position of the second axle element relative to the first axle element, and/or any other data. In various cases, additional data may be provided by an additional sensor that may be remote from the wheel assemblies, which may provide data related to a location of the vehicle, a speed of the vehicle, and/or any other data.

A computing system can be communicatively coupled to the one or more sensors. The computing system can be configured to receive an input related to an adjustment to the position of the second axle element relative to the fore-aft axis. In addition, the computing system may be configured to generate an adjustment model based at least partially on the input and the vehicle data. In some cases, a track width adjustment model may define various conditions for each wheel assembly during a wheel track adjustment process. For example, the conditions can include an amount of movement by a respective track-width actuator that is configured to alter a position of the second axle element relative to the first axle element and/or a steering actuator that causes a steering angle of each wheel to be "toed-in" or "toed-out" by the steering actuators in conjunction with and/or instead of the respective tread-width actuators.

Figure 1:
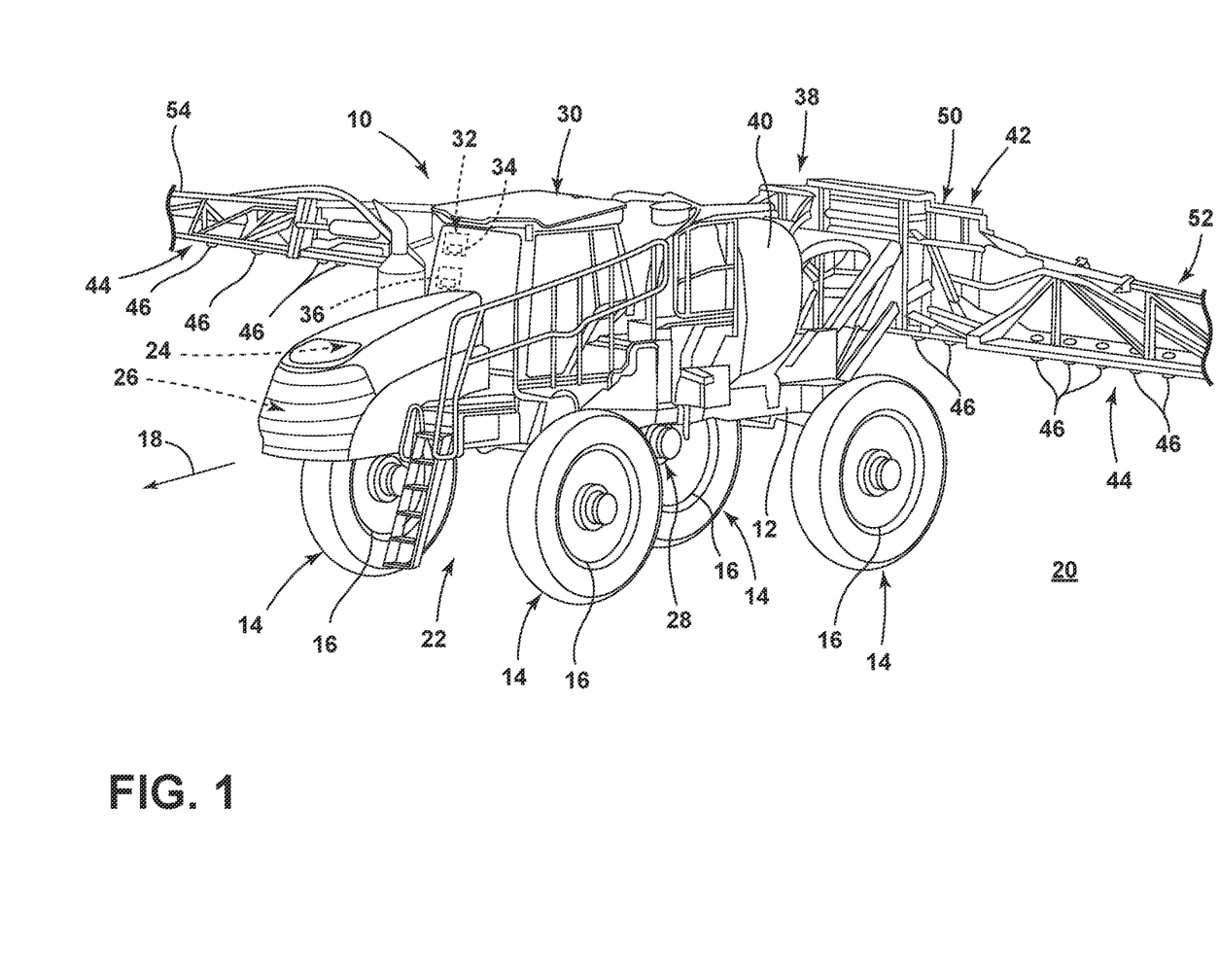
FIG. 1 illustrates a perspective view of an agricultural vehicle in accordance with aspects of the present subject matter.
Figure 2:
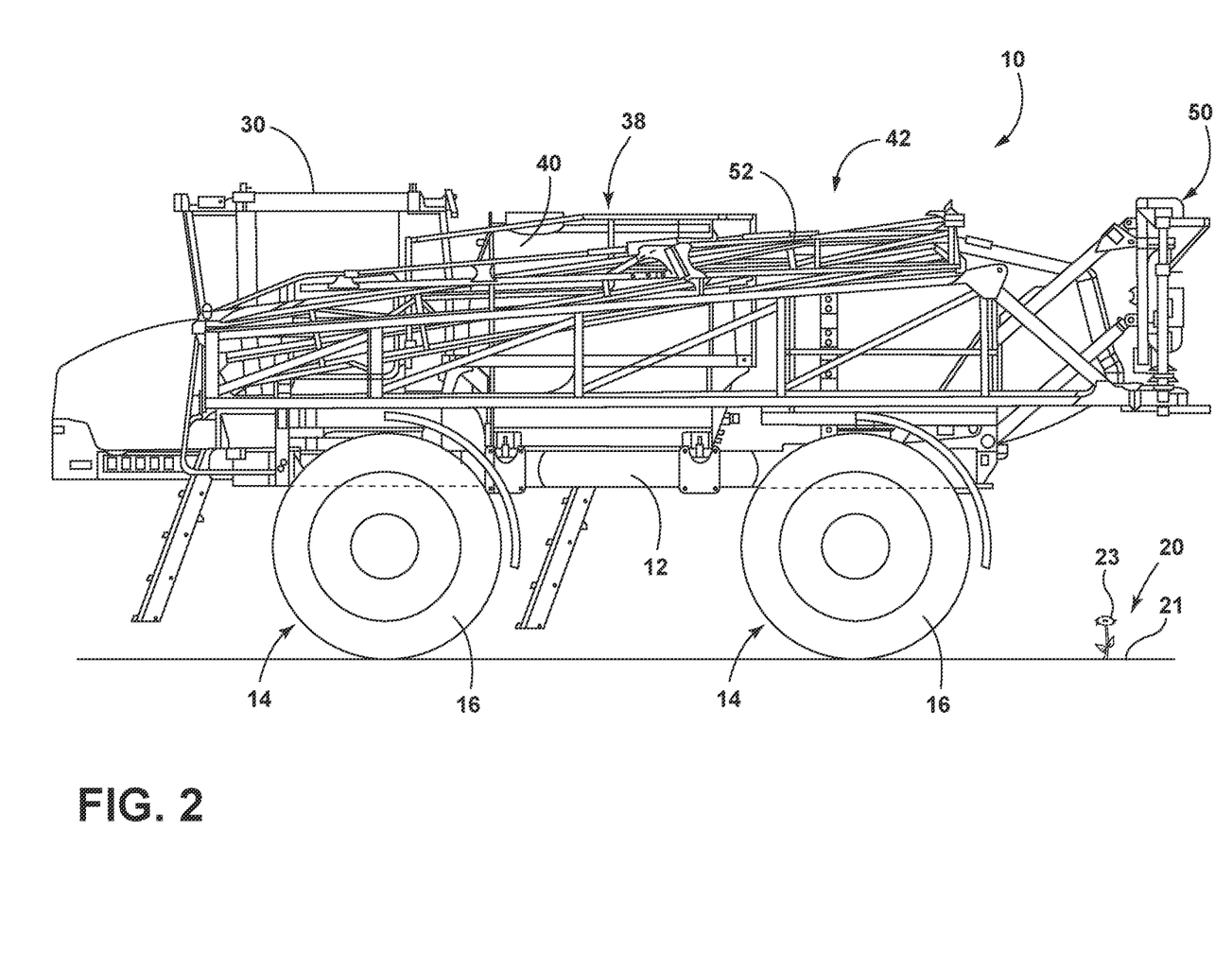
FIG. 2 illustrates a side view of the vehicle in accordance with aspects of the present subject matter.

Referring now to FIGS. 1 and 2, a vehicle 10 is generally illustrated as a self-propelled agricultural applicator. However, in alternate embodiments, the vehicle 10 may be configured as any other suitable type of vehicle 10 configured to perform agricultural application operations, such as a tractor or other vehicle configured to haul or tow an application implement.

In various embodiments, the vehicle 10 may include a frame 12 configured to support or couple to a plurality of components. For example, front and rear wheel assemblies 14 may be coupled to the frame 12. Each of the wheel assemblies 14 can include a wheel 16 (e.g., a rim and a tire), among other components. The wheel assemblies 14 may be configured to support the vehicle 10 relative to a spray target 20, such as a ground surface 21 (FIG. 2) or and/underlying object 23 (FIG. 2), and move the vehicle 10 in a direction of travel (e.g., as indicated by arrow 18 in FIG. 1) relative to the spray target 20. In this regard, the vehicle 10 may include a powertrain control system 22 that includes a power plant 24, such as an engine, a motor, or a hybrid engine-motor combination, a transmission, and/or a hydraulic system 26 configured to transmit power from the engine to the wheel assemblies 14 or any other system, and/or a brake system 28.

The frame 12 may also support a cab 30, or any other form of user's station, for permitting the user to control the operation of the vehicle 10. For instance, as shown in FIG. 1, the vehicle 10 may include a user interface 32 having a display 34 for providing information in the form of messages and/or alerts to the user and/or for allowing the user to interface with the vehicle's controller through one or more user input devices 36 (e.g., levers, pedals, control panels, buttons, and/or the like).

The frame 12 may also support a product system 38 that includes one or more tanks 40, such as a rinse tank and/or a product tank, and a boom assembly 42 mounted to the frame 12. The product tank is generally configured to store or hold an agricultural product, such as a pesticide, a fungicide, a rodenticide, a fertilizer, a nutrient, and/or the like. The agricultural product is conveyed from the product tank through plumbing components, such as interconnected pieces of tubing, for release onto the underlying spray target 20, such as a ground surface 21 (FIG. 2) or and/underlying object 23 (FIG. 2), through an application system 44 that can include one or more nozzle assemblies 46 mounted on the boom assembly 42.

As shown in FIGS. 1 and 2, the boom assembly 42 can include a frame 50 that supports first and second boom arms 52, 54, which may be orientated in a cantilevered nature. The first and second boom arms 52, 54 are generally movable between an operative or unfolded position (FIG. 1) and an inoperative or folded position (FIG. 2). When distributing the product, the first and/or second boom arm 52, 54 extends laterally outward from the vehicle 10 to cover swaths of the underlying spray target 20, such as a ground surface 21 (FIG. 2) or and/underlying object 23 (FIG. 2), as illustrated in FIG. 1. However, to facilitate transport, each boom arm 52, 54 of the boom assembly 42 may be independently folded forwardly or rearwardly into the inoperative position, thereby reducing the overall width of the vehicle 10, or in some examples, the overall width of a towable implement when the applicator is configured to be towed behind the vehicle 10.

Figure 3:
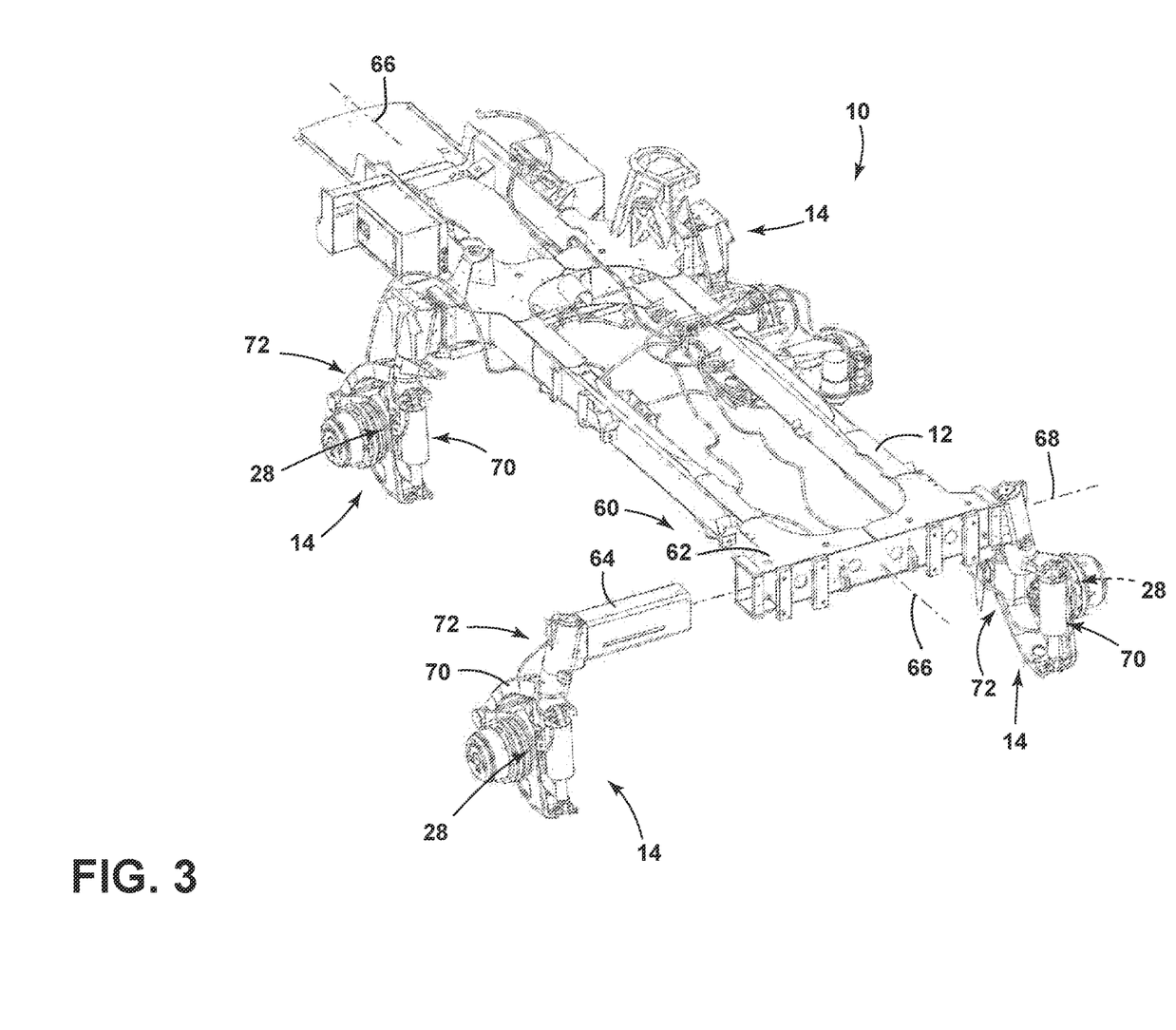
FIG. 3 is a perspective view of a frame of the vehicle and a plurality of wheel assemblies respectively coupled with the frame through axle arrangements in accordance with aspects of the present subject matter.

Referring now to FIG. 3, in some examples, the wheel assemblies 14 may be respectively operatively connected to the frame 12 by an axle arrangement 60. In some cases, the axle arrangement 60 includes first and second slidingly engaging axle elements 62, 64 adapted for operative connection between the frame 12 and the wheel assemblies 14, to provide extension and retraction of the first and second axle elements 62, 64, with respect to one another.

As shown in FIG. 3, the frame 12 of the vehicle 10 defines a fore-aft axis 66 and a transverse axis 68 extending generally transverse to the fore-aft axis 66. In the illustrated example, a portion of the frame 12 can serve as the first axle element 62. Further, the second axle element 64 may form part of the wheel assembly 14. In various cases, the wheel assembly 14 can include, one or more components of a suspension assembly 70, one or more components of the brake system 28, one or more components of a steering assembly 72, the wheel 16 (FIG. 1) (which can include a tire and a rim), a wheel end unit, and/or any other component. Any component of the wheel assembly 14 may be movable with the second axle element 64 along the transverse axis 68 as the tread-width of the vehicle 10 is adjusted. Although the axle arrangement 60 for the left rear wheel 16 of the vehicle 10 is illustrated in an exploded manner in FIG. 3, it is understood that the description would also apply to the other wheel assemblies 14 of the vehicle 10. As shown in FIG. 3, the second axle element 64 can be positioned within the first axle element 62 and slidable relative to the first axle element 62. Accordingly, the track width of the vehicle 10 may be adjusted by altering a position of each second axle element 64 relative to the first axle element 62. However, in some instances, more than one wheel 16 may be operably coupled with a single second axle element 64 so that multiple wheels 16 may be moved contemporaneously with one another.

Figure 4:
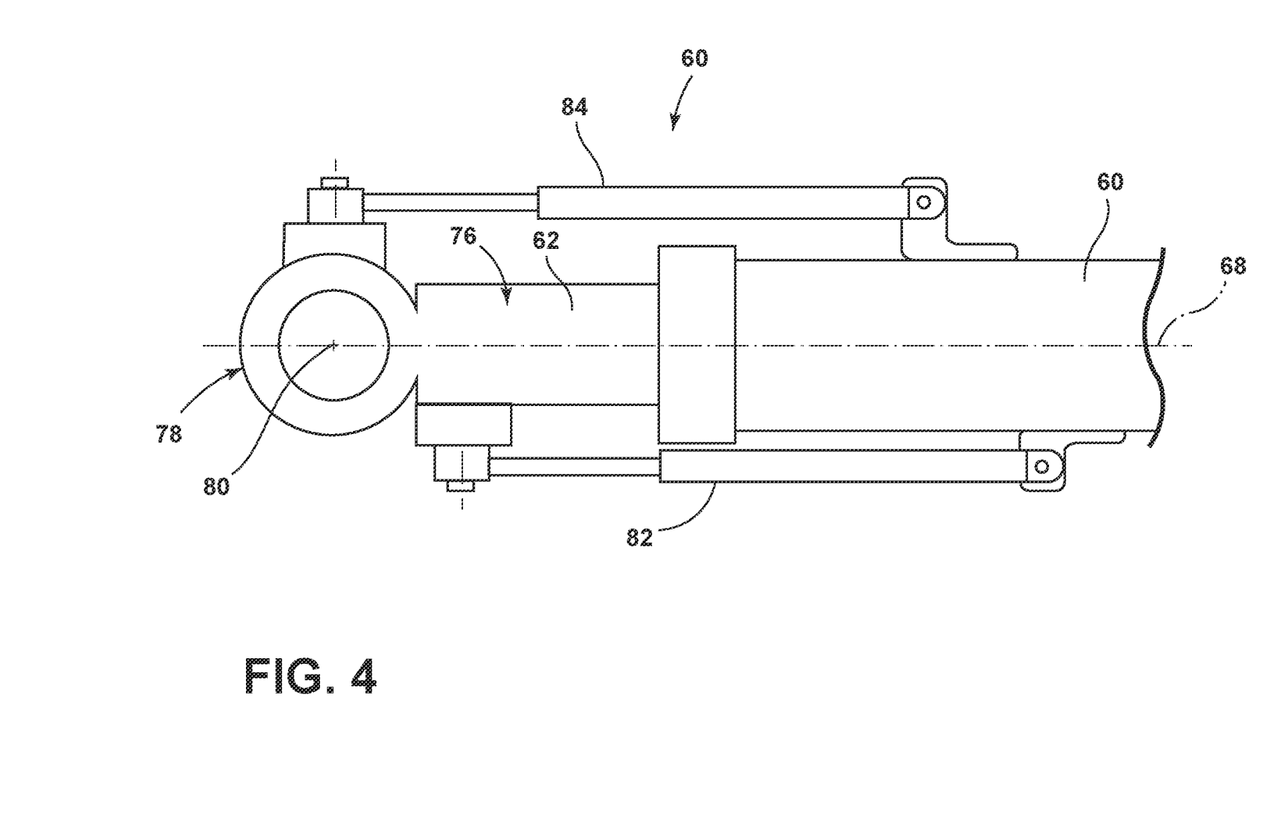
FIG. 4 is a top schematic view of an axle arrangement supporting a wheel assembly in accordance with aspects of the present subject matter.

Referring now to FIG. 4, the axle arrangement 60 and a wheel assembly 14 are schematically illustrated according to various aspects of the present disclosure. As illustrated, the wheel assembly 14 can include the second axle element 64. The second axle element 64 can include a first segment 76 that is slidable along the first axle element 62 and a second segment 78 that supports one or more additional components of the wheel assembly 14. As illustrated, the second segment 78 can define a rotational axis 80 for altering a position of a wheel 16 or other ground-engaging component relative to the frame 12.

In some examples, a tread-width actuator 82 may be operatively connected with the first axle element 62 and the first segment 76 of the second axle element 64 for selectively extending and retracting the second element 64 thereby adjusting the track width of the vehicle 10. In various forms, the track-width actuator may be manually operable or include a powered actuator such as a hydraulic cylinder, an electrically-driven linear actuator, or any other practicable type of actuator.

Adjustment of track width can be made through activation of the tread-width actuators 82 which move the second axle element 64 either inward, with respect to the fixed first axle element 62, toward the fore-aft axis 66 (FIG. 3) or away from the fore-aft axis 66 (FIG. 3). An increase in track width is caused by the second axle element 64 being moved laterally outboard with respect to the first axle element 62 by the action of the tread-width actuators 82 extending in length. A decrease in track width is caused by the action of the tread-width actuators 82 shortening in length.

Additionally or alternatively, in various examples, a steering actuator 84 may be operatively connected with the first axle element 62 and the second segment 78 of the second axle element 64 for selectively rotating the second segment 78 of the second element 64 to alter the direction of the vehicle 10 by altering a steering angle of the wheel 16 to the frame 12. In various forms, the steering actuator 84 may be manually operable or include a powered element such as a hydraulic cylinder, an electrically-driven linear actuator, or any other appropriate type of actuator. In various examples, each wheel assembly 14 of the vehicle 10 can include a steering actuator 84 such that the vehicle 10 is capable of four-wheel steering. However, any other steering configuration may be utilized by the vehicle 10 without departing from the scope of the present disclosure.

Figure 5:
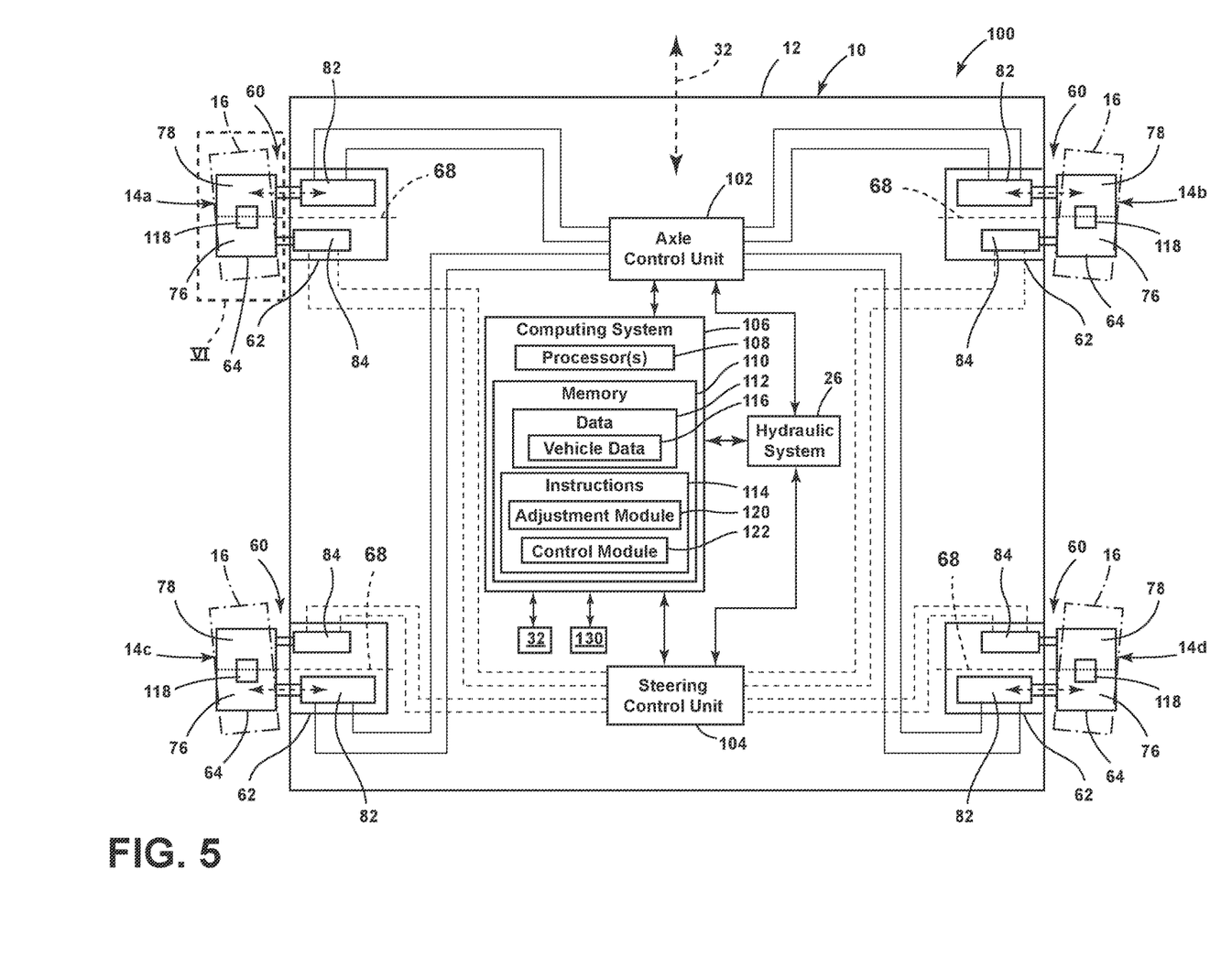
FIG. 5 illustrates a schematic diagram of components of a vehicle system in accordance with aspects of the present subject matter.

Referring now to FIG. 5, a schematic view of a system 100 for operating the vehicle 10 is illustrated in accordance with aspects of the present subject matter. In general, the system 100 will be described with reference to the vehicle 10 described above with reference to FIGS. 1-4. However, it should be appreciated by those of ordinary skill in the art that the disclosed system 100 may generally be utilized with agricultural machines having any other suitable machine configuration. Additionally, it should be appreciated that, for purposes of illustration, communicative links, or electrical couplings of the system 100 shown in FIG. 5 are indicated by dashed lines.

As shown in FIG. 5, the vehicle 10 may include four wheel assemblies 14*a-d*. As such, the vehicle 10 may include a first wheel assembly 14*a* operably coupled with the frame 12 on a first side of the fore-aft axis 66. First and second axle elements 62, 64 may be adapted for operative connection between the frame 12 and the first wheel assembly 14*a* for extension and retraction along a first transverse axis 68. The first axle element 62 may be operably coupled with the frame 12 and the second axle element 64 may be integrated with the first wheel assembly 14*a*.

A second wheel assembly 14*b* may be operably coupled with the frame 12 on a second, opposing side of the fore-aft axis 66. The first and second axle elements 62, 64 of the second wheel assembly 14*b* may be adapted for operative connection between the frame 12 and the second wheel assembly 14*b* for extension and retraction along a second transverse axis 68, which may be parallel to the first transverse axis 68 and/or aligned with the first axis 68. The first axle element 62 of the second wheel assembly 14*b* may be operably coupled with the frame 12 and the second axle element 64 of the second wheel assembly 14*b* may be integrated with the second wheel assembly 14*b*.

A third wheel assembly 14*c* may be operably coupled with the frame 12 on the first side of the fore-aft axis 66 and aft of the first wheel assembly 14*a*. The first and second axle elements 62, 64 of the third wheel assembly 14*c* may be adapted for operative connection between the frame 12 and the third wheel assembly 14*c* for extension and retraction along a third transverse axis 68, which may be parallel to the first transverse axis 68 and/or the second transverse axis 68. The first axle element 62 of the third wheel assembly 14*c* may be operably coupled with the frame 12 and the second axle element 64 of the third wheel assembly 14*c* may be integrated with the third wheel assembly 14*c*.

A fourth wheel assembly 14*d* may be operably coupled with the frame 12 on the second, opposing side of the fore-aft axis 66 and aft of the second wheel assembly 14*b*. First and second axle elements 62, 64 of the fourth wheel assembly 14*d* may be adapted for operative connection between the frame 12 and the fourth wheel assembly 14*d* for extension and retraction along a fourth transverse axis 68, which may be parallel to the first transverse axis 68, the second transverse axis 68, and/or the third transverse axis 68. The first axle element 62 of the fourth wheel assembly 14*d* may be operably coupled with the frame 12 and the second axle element 64 of the fourth wheel assembly 14*d* may be integrated with the fourth wheel assembly 14*d*.

Each wheel assembly 14*a-d* may be operably coupled with a respective tread-width actuator 82. Each of the tread-width actuators 82 may be operably coupled with an axle control unit 102 that is configured to control the extension and/or retraction of each of the tread-width actuators 82. In some examples, such as the one illustrated in FIG. 5, the axle control unit 102 may define a hydraulic circuit that is operably coupled with the hydraulic system 26. The hydraulic system 26 may receive power from the power plant 24 or any other source and can include at least one hydraulic pump, which can be in a hydrostat arrangement and/or any other arrangement.

Referring still to FIG. 5, each wheel assembly 14*a-d* may additionally or alternatively be operably coupled with a respective steering actuator 84. Each of the steering actuators 84 may be operably coupled with a steering control unit 104 that is configured to control the extension and/or retraction of each of the steering actuators 84 to obtain a desired steering angle. In some examples, such as the one illustrated in FIG. 5, the steering control unit 104 may define a hydraulic circuit that is operably coupled with a hydraulic system 26. However, the steering control unit 104 may be operable in any other manner, such as mechanically and/or electrically, without departing from the teachings provided herein.

With further reference to FIG. 5, the system 100 may also include a computing system 106 operably coupled with the axle control unit 102, the steering control unit 104, and/or the hydraulic system 26. In general, the computing system 106 may be configured as any suitable processor-based device, such as a computing device or any suitable combination of computing devices. Thus, in several embodiments, the computing system 106 may include one or more processors 108 and associated memory 110 configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory 110 of the computing system 106 may generally comprise memory elements including, but not limited to, a computer readable medium (e.g., random access memory (RAM)), a computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory 110 may generally be configured to store information accessible to the processor 108, including data 112 that can be retrieved, manipulated, created, and/or stored by the processor 108 and instructions 114 that can be executed by the processor 108, when implemented by the processor 108, configure the computing system 106 to perform various computer-implemented functions, such as one or more aspects of the image processing algorithms and/or related methods described herein. In addition, the computing system 106 may also include various other suitable components, such as a communications circuit or module, one or more input/output channels, a data/control bus, and/or the like.

In various embodiments, the computing system 106 may correspond to an existing controller of the agricultural vehicle 10, or the computing system 106 may correspond to a separate processing device. For instance, in some embodiments, the computing system 106 may form all or part of a separate plug-in module or computing device that is installed relative to the vehicle 10 to allow for the disclosed system 100 and method to be implemented without requiring additional software to be uploaded onto existing control devices of the vehicle 10.

In several embodiments, the data 112 may be information received and/or generated by the computing system 106 that is stored in one or more databases. For instance, as shown in FIG. 5, the memory 110 may include a vehicle database 116, which may be configured to store data generated by one or more sensors 118 or other components operably coupled with the vehicle 10 and/or the computing system 106. For example, the vehicle 10 data may be received from respective wheel assembly 14*a-d* sensors 118 operably coupled with each wheel assembly 14*a-d*. In various instances, each wheel assembly sensor 118 may be capable of providing data related to the rotational speed of a tire (or another ground-engaging component) relative to a ground surface, an orientation of the tire (or another ground-engaging component) relative to the frame 12, a position of the second axle element 64 relative to the first axle element 62, and/or any other data. In various cases, additional data may be provided by an additional sensor 118 that may be remote from the wheel assemblies 14*a-d*, which may provide data related to a location of the vehicle 10, a speed of the vehicle 10, and/or any other data.

In several embodiments, the instructions 114 stored within the memory 110 of the computing system 106 may be executed by the processor 108 to implement a track-width adjustment module 120 and/or a control module 122. For instance, in some cases, a track width adjustment model may define various conditions for each wheel assembly 14*a-d* during a wheel track adjustment process. For example, the conditions can include an amount of movement by a respective track-width actuator that is configured to alter a position of the second axle element 64 relative to the first axle element 62 and/or a steering actuator 84 that causes a steering angle of each wheel 16 to be "toed-in" or "toed-out" by the steering actuators 84 in conjunction with and/or instead of the respective tread-width actuators 82. The steering angle is defined as the angle between a current direction of a centerline axis 124 of a wheel 16 of the vehicle 10 and the fore-aft axis 66 as shown in FIG. 6.

In general, the track-width adjustment module 120 may be configured to process/analyze the data 112 to determine a track-width adjustment model based on the current position of the second axle element 64 relative to the first axle element 62, the steering angle of each wheel assembly 14*a-d*, the speed of the vehicle 10, etc. The track width adjustment model can define an amount of movement for each track-width actuator and/or an amount of movement for each steering actuator 84 to accomplish a steering angle of each wheel assembly 14*a-d* in order to reach a defined track width, which may be received from a user input through the user interface 32, through analysis of crop orientations/placement within a field, and/or through any other method.

In several embodiments, the track-width adjustment module 120 may be configured to execute one or more suitable data processing techniques or algorithms that allow the computing system 106 to accurately and efficiently analyze the sensor data, such as by applying corrections or adjustments to the data based on the sensor type, sensor resolution, and/or other parameters associated with the data, by filtering the data to remove outliers, by implementing sub-routines or intermediate calculations to estimate a model, and/or by performing any other desired data processing-related techniques or algorithms. Additionally, or alternatively, the memory may implement machine learning methods and algorithms that utilize one or several machine learning techniques including, for example, decision tree learning, including, for example, random forest or conditional inference trees methods, neural networks, support vector machines, clustering, and Bayesian networks. In some instances, the machine learning engine may allow for changes to be performed without human intervention.

Figure 6:
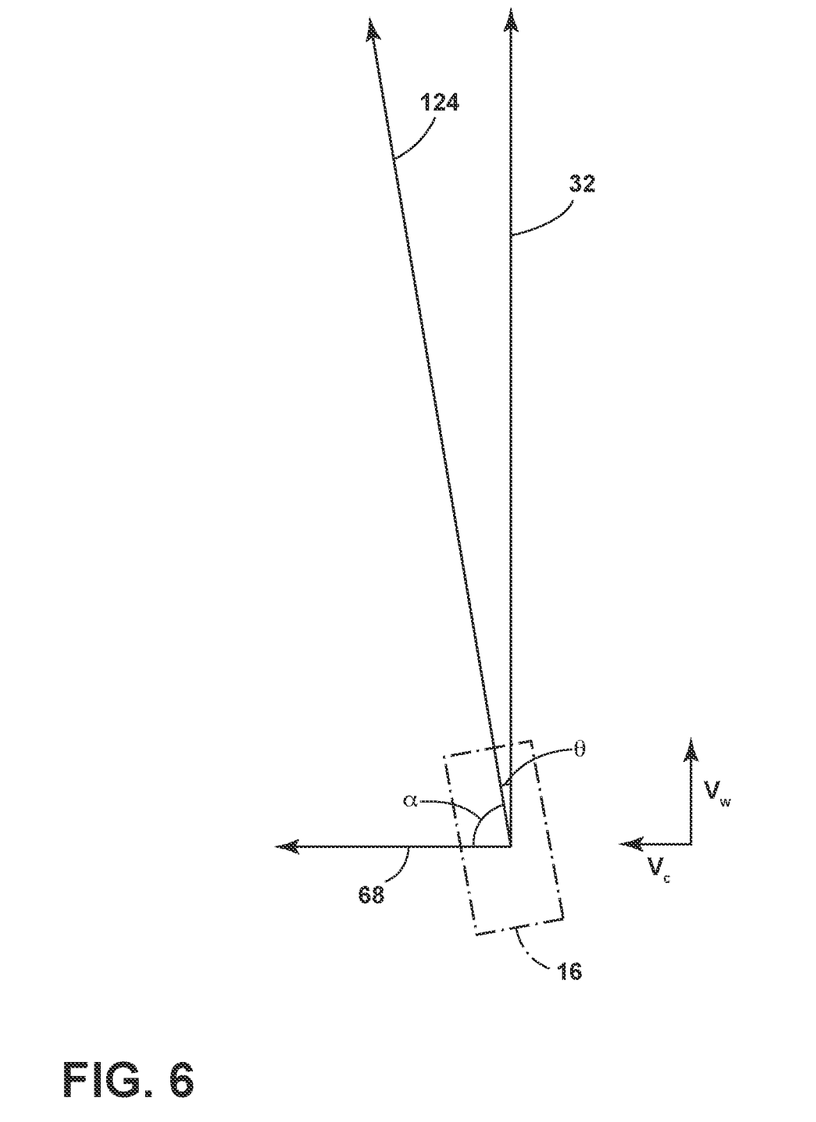
FIG. 6 is a schematic illustration of a geometric relationship of a wheel assembly in accordance with aspects of the present subject matter.

In some instances, the adjustment model may adjust the steering angle of one or more wheel assemblies 14*a-d* in a toed-in or toed-out manner, as illustrated in FIGS. 5 and 6, to assist in altering the track width. For example, with reference to FIGS. 5 and 6, when the vehicle 10 is equipped with four-wheel steering, the adjustment model may determine a defined steering angle based at least in part on a current steering angle, the speed of the vehicle 10 and/or the speed of extension/retraction of the steering actuator 84 while the vehicle 10 is operated between a minimum threshold speed (e.g., 0.5 miles per hour (mph)) and a maximum threshold speed (e.g., 5 mph). In some cases, the defined steering angle may be based on the following equation (1):

$$\theta = 90 - \alpha, \tag{1}$$

where θ is the defined steering angle relative to the fore-aft axis 66 and α is the complementary angle between the transverse axis 68 and the defined steering angle. To determine the complementary angle, the following equation (2) may be used:

$$\alpha = \tan^{-1}\frac{V_w}{V_c}, \tag{2}$$

where $V_w$ is the speed of the wheel 16 relative to the fore-aft axis 66 and $V_c$ is the speed of extension/retraction of the steering actuator 84. In such instances, if the wheel 16 is moving at a speed of 0.5 mph (8.8 inches per second) and the steering actuator 84 moves at an average extension/retraction speed of 5 inches per second, then the defined steering angle can be equal to that of equation (3):

$$\theta = 90 - \tan^{-1}\frac{8.8}{5} = 29.6°. \tag{3}$$

Similarly, if the wheel 16 is moving at a speed of 5 mph (88 inches per second) and the steering actuator 84 moves at an average extension/retraction speed of 5 inches per second, then the defined steering angle can be equal to that of equation (4):

$$\theta = 90 - \tan^{-1}\frac{88}{5} = 3.252°. \tag{4}$$

Referring back to FIG. 5, the control module 122 may provide instructions for various components communicatively coupled with the computing system 106 based on the adjustment model generated by the track-width adjustment module 120. For example, the control module 122 may provide instructions to the steering control unit 104 so that a steering actuator 84 adjusts a defined steering angle from the current wheel angle to the defined steering angle. Additionally or alternatively, the control module 122 may provide instructions to the axle control unit 102 so that a tread-width adjustment actuator adjusts the length thereof for altering and/or maintaining the wheel assembly 14*a-d* in a defined position relative to the fore-aft axis 66.

Referring further to FIG. 5, a notification system 130 may be operably coupled with the computing system 106. In some cases, the notification system 130 can provide information to an operator when the current vehicle speed is below the minimum threshold speed or above the maximum threshold speed. The vehicle notification system 130 may prompt visual, auditory, and tactile notifications and/or warnings when an input is received (either manually or with no human initiation) and the current vehicle speed is below a minimum threshold speed or above a maximum threshold speed. For instance, vehicle brake lights and/or vehicle emergency flashers may provide a visual alert. A vehicle horn and/or speaker may provide an audible alert. A haptic device integrated into the cab 30 (FIG. 1) and/or any other location may provide a tactile alert. Additionally, the computing system 106 and/or the vehicle notification system 130 may communicate with the user interface 32 of the vehicle 10.

Although the various control functions and/or actions are generally described herein as being executed by the computing system 106, one or more of such control functions/actions (or portions thereof) may be executed by a separate computing system 106 or may be distributed across two or more computing systems (including, for example, the computing system 106 and a separate computing system). For instance, in some embodiments, the computing system 106 may be configured to acquire data from the sensors 118 for subsequent processing and/or analysis by a separate computing system (e.g., a computing system associated with a remote server). In other embodiments, the computing system 106 may be configured to execute the track-width adjustment module 120, while a separate computing system (e.g., a vehicle computing system associated with the agricultural vehicle 10) may be configured to execute the control module 122 to control the operation of the agricultural vehicle 10 based on data and/or instructions transmitted from the computing system 106. Likewise, in some embodiments, the computing system 106 may be configured to acquire data from the sensors 118 for subsequent processing and/or analysis by a separate computing system (e.g., a computing system associated with a remote server). In other embodiments, the computing system 106 may be configured to execute the track-width adjustment module 120 to determine an adjustment model, while a separate computing system (e.g., a vehicle computing system associated with the agricultural vehicle 10) may be configured to execute the control module 122 to control the operation of the agricultural vehicle 10 based on data and/or instructions transmitted from the computing system 106 that is associated with the adjustment model.

Figure 7:
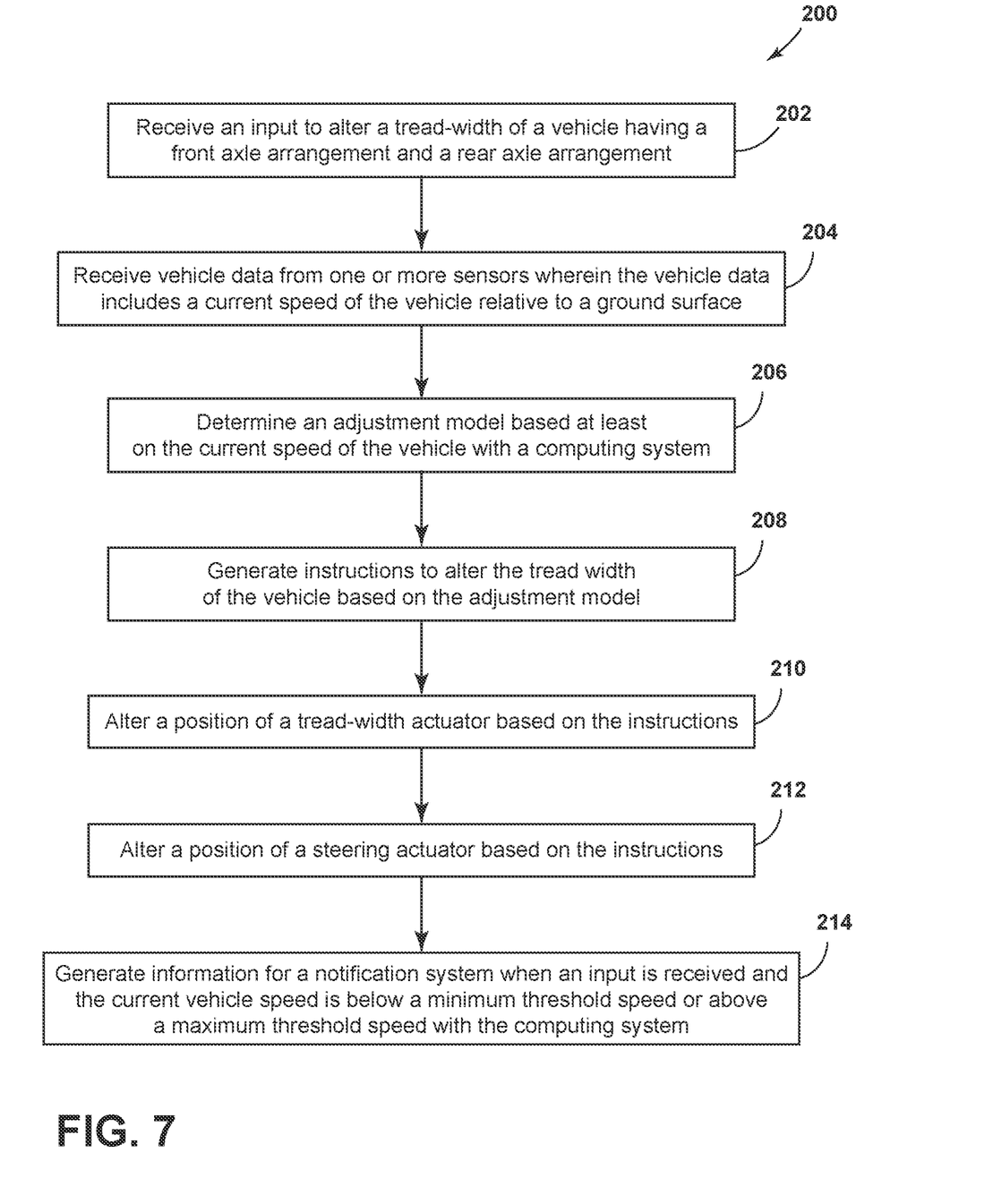
FIG. 7 illustrates a flow diagram of a method for an operation of a vehicle system in accordance with aspects of the present subject matter.

Referring now to FIG. 7, a flow diagram of some embodiments of a method 200 for an operation of a vehicle system is illustrated in accordance with aspects of the present subject matter. In general, the method 200 will be described herein with reference to the vehicle 10 and the system 100 described above with reference to FIGS. 1-6. However, the disclosed method 200 may generally be utilized with any suitable agricultural vehicle 10 and/or may be utilized in connection with a system having any other suitable system configuration. In addition, although FIG. 7 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 7, at (202), the method 200 can include receiving an input to alter a tread-width of a vehicle having a front axle arrangement and a rear axle arrangement. In various instances, the input may be received from a user input through the user interface, through analysis of crop orientations/placement within a field, and/or through any other method.

At (204), the method 200 can include receiving vehicle data from one or more sensors wherein the vehicle data includes a current speed of the vehicle relative to a ground surface.

At (206), the method 200 can include determining an adjustment model based at least in part on the current speed of the vehicle with a computing system. At (208), the method 200 can include generating instructions to alter the tread-width of the vehicle based on the adjustment model. For instance, in some cases, a track width adjustment model may define various conditions for each wheel assembly during a wheel track adjustment process. For example, the conditions can include an amount of movement by a respective track-width actuator that is configured to alter a position of the second axle element relative to the first axle element and/or a steering actuator that causes a steering angle of each wheel to be "toed-in" or "toed-out" by the steering actuators in conjunction with and/or instead of the respective tread-width actuators.

At (210), the method 200 can include altering a position of a tread-width actuator based on the instructions. In some cases, the tread-width actuator operably coupled between a first axle element of the front axle arrangement and a second axle element of the front axle arrangement. Additionally or alternatively, at (212), the method 200 can include altering a position of a steering actuator based on the instructions. In some instances, the steering actuator operably coupled between a frame of the vehicle and a wheel assembly further coupled with the front axle arrangement.

At (214), the method 200 can include generating information for a notification system when an input is received and the current vehicle speed is below a minimum threshold speed or above a maximum threshold speed with the computing system.

In various examples, the methods 200 may implement machine learning methods and algorithms that utilize one or several vehicle learning techniques including, for example, decision tree learning, including, for example, random forest or conditional inference trees methods, neural networks, support vector machines, clustering, and Bayesian networks. These algorithms can include computer-executable code that can be retrieved by the computing system and/or through a network/cloud and may be used to evaluate and update the adjustment model. In some instances, the vehicle learning engine may allow for changes to the adjustment model to be performed without human intervention.

It is to be understood that the steps of any method disclosed herein may be performed by a computing system upon loading and executing software code or instructions that are tangibly stored on a tangible computer-readable medium, such as on a magnetic medium, e.g., a computer hard drive, an optical medium, e.g., an optical disc, solid-state memory, e.g., flash memory, or other storage media known in the art. Thus, any of the functionality performed by the computing system described herein, such as any of the disclosed methods, may be implemented in software code or instructions that are tangibly stored on a tangible computer-readable medium. The computing system loads the software code or instructions via a direct interface with the computer-readable medium or via a wired and/or wireless network. Upon loading and executing such software code or instructions by the controller, the computing system may perform any of the functionality of the computing system described herein, including any steps of the disclosed methods.

The term "software code" or "code" used herein refers to any instructions or set of instructions that influence the operation of a computer or controller. They may exist in a computer-executable form, such as vehicle code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A vehicle system comprising:
   an axle arrangement operably coupling a first wheel assembly with a frame, the frame defining a fore-aft axis, a first transverse axis extending generally transverse to the fore-aft axis, the axle arrangement comprising:
      first and second axle elements adapted for operative connection between the frame and the first wheel assembly for extension and retraction along the first transverse axis, the first axle element operably coupled with the frame and the second axle element integrated with the second wheel assembly:
   a steering actuator operably coupled with the wheel assembly and the frame and configured to alter a defined steering angle of a wheel of the wheel assembly relative to the fore-aft axis; and
   a computing system communicatively coupled to the steering actuator, the computing system being configured to:
      receive an input related to an adjustment to a position of the second axle element relative to the fore-aft axis; and
      determine a steering angle of the wheel based at least in part on a speed of the vehicle and an average speed of movement of the steering actuator.

2. The system of claim 1, wherein the computing system is further configured to:
   generate instructions for a steering control unit, the steering control unit controlling an amount of movement of the steering actuator to obtain the steering angle.

3. The system of claim 2, wherein the steering control unit defines a hydraulic circuit.

4. The system of claim 1, further comprising:
   a tread-width actuator operably coupled with the frame and the second axle element and configured to direct an amount of movement of the second element relative to the first axle element.

5. The system of claim 4, wherein the computing system is further configured to:
   generate instructions for an axle control unit based at least partially on the input.

6. The system of claim 5, wherein the axle control unit defines a hydraulic circuit.

7. The system of claim 1, further comprising:
   one or more sensors configured to generate vehicle data, and wherein the computing system is further configured to:
   generate an adjustment model based at least partially on the input and the vehicle data.

8. The system of claim 7, wherein the adjustment model vehicle is operated between a minimum threshold speed and a maximum threshold speed.

9. The system of claim 8, further comprising:
   a notification system operably coupled with the computing system, wherein the notification system provides information to an operator when a current vehicle speed is below the minimum threshold speed or above the maximum threshold speed.

10. The system of claim 7, wherein the adjustment model defines a defined steering angle of the first wheel assembly and an amount of movement of a tread-width actuator.

11. The system of claim 1, wherein the axle arrangement operably couples a second wheel assembly operably coupled with the frame on an opposing side of the fore-aft axis, and wherein the axle arrangement further comprises:
   first and second axle elements adapted for operative connection between the frame and the second wheel assembly for extension and retraction along a second transverse axis, the first axle element of the second wheel assembly operably coupled with the frame and the second axle element of the second wheel assembly integrated with the second wheel assembly.

12. A method for an operation of a vehicle system, the method comprising:
   receiving an input to alter a tread-width of a vehicle having a front axle arrangement and a rear axle arrangement;
   receiving, from one or more sensors, vehicle data, wherein the vehicle data includes a current speed of the vehicle relative to a ground surface;
   determining, with a computing system, an adjustment model based at least in part on the current speed of the vehicle; and
   generating instructions to alter the tread-width of the vehicle based on the adjustment model.

13. The method of claim 12, further comprising:
   altering a position of a tread-width actuator based on the instructions, the tread-width actuator operably coupled between a first axle element of the front axle arrangement and a second axle element of the front axle arrangement.

14. The method of claim 13, wherein altering a position of a tread-width actuator comprises activating an axle control unit, the axle control unit defining a hydraulic circuit.

15. The method of claim 12, further comprising:
   altering a position of a steering actuator based on the instructions, the steering actuator operably coupled between a frame of the vehicle and a wheel assembly further coupled with the front axle arrangement.

16. The method of claim 15, wherein altering a position of a steering actuator comprises activating a steering control unit, the steering control unit defining a hydraulic circuit.

17. The method of claim 12, wherein determining the adjustment model based at least in part on the current speed of the vehicle further comprises determining the adjustment model based on an actuation speed of a steering actuator.

18. The method of claim 12, further comprising:
generating, with the computing system, information for a notification system when an input is received and the current vehicle speed is below a minimum threshold speed or above a maximum threshold speed.

19. A vehicle system comprising:
an axle arrangement operably coupling a wheel assembly with a frame, the frame defining a fore-aft axis, a transverse axis extending generally transverse to the fore-aft axis, the axle arrangement comprising:
first and second axle elements adapted for operative connection between the frame and the wheel assembly for extension and retraction along the transverse axis, the first axle element operably coupled with the frame and the second axle element integrated with the wheel assembly;
one or more sensors configured to generate vehicle data;
a computing system communicatively coupled to the one or more sensors, the computing system being configured to:
receive an input related to an adjustment to a position of the second axle element relative to the fore-aft axis; and
generate an adjustment model based at least partially on the input and the vehicle data.

20. The vehicle system of claim 19, wherein the adjustment model defines a steering angle of the wheel based at least in part on a speed of the vehicle and an average speed of movement of the steering actuator.

* * * * *